United States Patent [19]

Kettler et al.

[11] Patent Number: 5,195,310

[45] Date of Patent: Mar. 23, 1993

[54] MATERIAL COLLECTION SYSTEM

[75] Inventors: Daniel J. Kettler, Beaver Dam; Daniel A. Sebben, West Bend, both of Wis.

[73] Assignee: Deere & Company, Moline, Ill.

[21] Appl. No.: 797,600

[22] Filed: Nov. 25, 1991

[51] Int. Cl.$^5$ ............................................. A01D 34/70
[52] U.S. Cl. .................................... 56/202; 56/203
[58] Field of Search .......................... 56/202, 203, 199

[56] References Cited

U.S. PATENT DOCUMENTS 4,723,398 2/1988 Flenniken et al. ................. 56/202 X
5,018,346 5/1991 Ishimaru et al. ....................... 56/202

*Primary Examiner*—Terry Lee Melius

[57] ABSTRACT

A material collection mechanism coupled with a mowing vehicle and having a container mechanism or a flexible bag for receiving air and air-borne material, and within which the material may accumulate. A support mechanism is coupled with an attachment mechanism and extends upwardly therefrom for supporting the container. The support mechanism includes a generally vertically extending chamber for rigidifying the support mechanism, and is also adapted to receive air from the container for channeling the air downwardly for discharge adjacent to the ground. An attachment mechanism is provided for coupling the material collection mechanism with the vehicle. A mechanism is provided for maintaining the bags in material receiving position.

43 Claims, 3 Drawing Sheets

MATERIAL COLLECTION SYSTEM

BACKGROUND OF THE INVENTION

1. Field of the Invention

The invention relates to grass clippings collectors carried by vehicles such as riding lawn mowers for collecting vegetation clippings cut by the mower, and for venting the air which has carried the materials to the collector.

2. Description of the Related Art

Mowing vehicles such as riding lawn tractors have often been provided with grass baggers. During mowing operation, the mower blade rotates within a mower deck or housing to generate a current of air while cutting vegetation. This current of air carries grass clippings into a chute that is coupled with the housing. The chute directs the air and clippings to a container or grass bag where the clippings accumulate. Conventional grass bagging systems typically provide mechanisms for venting the air from the bag in order to allow the proper flow of air from the housing to the bag via the chute. Without such a venting system, the flow of air stops once the bag fills with air, and the grass clippings then no longer flow through the chute and into the bag.

One type of conventional grass bagger provides a perforate bag within which clippings collect. Typically, these bags are a mesh or cloth material. The bags allow air to pass through the perforate material, and therefore the material of the bag itself acts as a vent. When the bags become full, they must be removed, and the grass emptied therefrom. These mesh or cloth bags are generally inoperative when lined with a plastic garbage bag, because the plastic material of the garbage bag is generally imperforate and would not allow air to be vented through the bag material. The air flow would be blocked, and the clippings would cease to be transported to the bags. Therefore, if the clippings are to be disposed of in plastic garbage bags, the operator must perform the additional step of dumping the clippings from the perforate bags and into the plastic garbage bags.

Another type of grass bagger provides a screen for allowing the air to be vented. A cover or hopper top is typically positioned over the open bag for directing the clippings from the chute into the bag. The screen is typically positioned in the wall of the hopper top to allow air to pass therethrough while blocking the grass clippings from exiting. Since the venting action is accomplished by a mechanism other than the bag itself, imperforate bags such as disposable garbage bags may be used to directly receive the clippings from the chute. The step of transferring the clippings from a cloth bag to a plastic garbage bag is thereby eliminated. However, many grass baggers position screens near the top of the bagger structure, and do not act to direct the air in any particular direction. Therefore, the vented air may be discharged near or at the vehicle operator, which may cause discomfort or annoyance to the operator.

Another type of grass bagger provides a chute or duct that channels the discharged air to a location and in a direction that will not cause annoyance or discomfort to the vehicle operator. These ducts tend to add to the material and assembly costs of the grass bagger mechanisms.

It would therefore be desirable to provide a material collector that receives air and clippings, and that properly vents air, thereby maintaining an adequate stream of air for transporting clippings to the collector. It would be desirable for such a collector to be adapted for directly accumulating the clippings in plastic garbage bags while maintaining proper venting action. It would also be desirable for such a collector to vent air to a location and in a direction that will not cause annoyance or discomfort to the vehicle operator, yet will not undesirably add to the material or assembly costs of the mechanism. It would further be desirable to provide a collector system that is easily removed from and installed on the vehicle without involving loose parts or the use of tools.

SUMMARY

The present invention provides a vegetation clippings collection mechanism adapted for being coupled to a powered mowing vehicle. The mechanism includes a container that receives air and air-borne grass clippings from a chute. The clippings accumulate in the container. A support structure extends upwardly from the vehicle for supporting the container. The support structure includes a generally vertically extending chamber for rigidly supporting the container. The chamber is also adapted to receive air from the container for venting and channeling the air downwardly for discharge near the ground. A screen positioned within the container adjacent the chamber inlet allows air to be vented from the container and into the chamber while blocking the passage of clippings. The mechanism also includes an attachment mechanism which couples the collector to the vehicle. The attachment mechanism includes a tube-like member fixedly coupled with the vehicle in inverted U-shaped position. A mating pocket is formed in the support means for removably receiving the tube like-member. The attachment mechanism therefore allows the support means and collection system to be easily attached to or removed from the vehicle. The chamber is configured to allow air to flow downwardly on either side of the pocket and tube-like member toward the ground. The collector is coupled to the rear portion of a mowing vehicle and between the mowing vehicle's rear wheels. Therefore, the chamber outlet directs air downwardly between the container and the vehicle near the ground.

BRIEF DESCRIPTION OF THE DRAWINGS

FIG. 3 is a sectional view taken along 3—3 of FIG. 2, and shows the clippings bag, bag frame structure, and support means.

DETAILED DESCRIPTION

Figure 1:
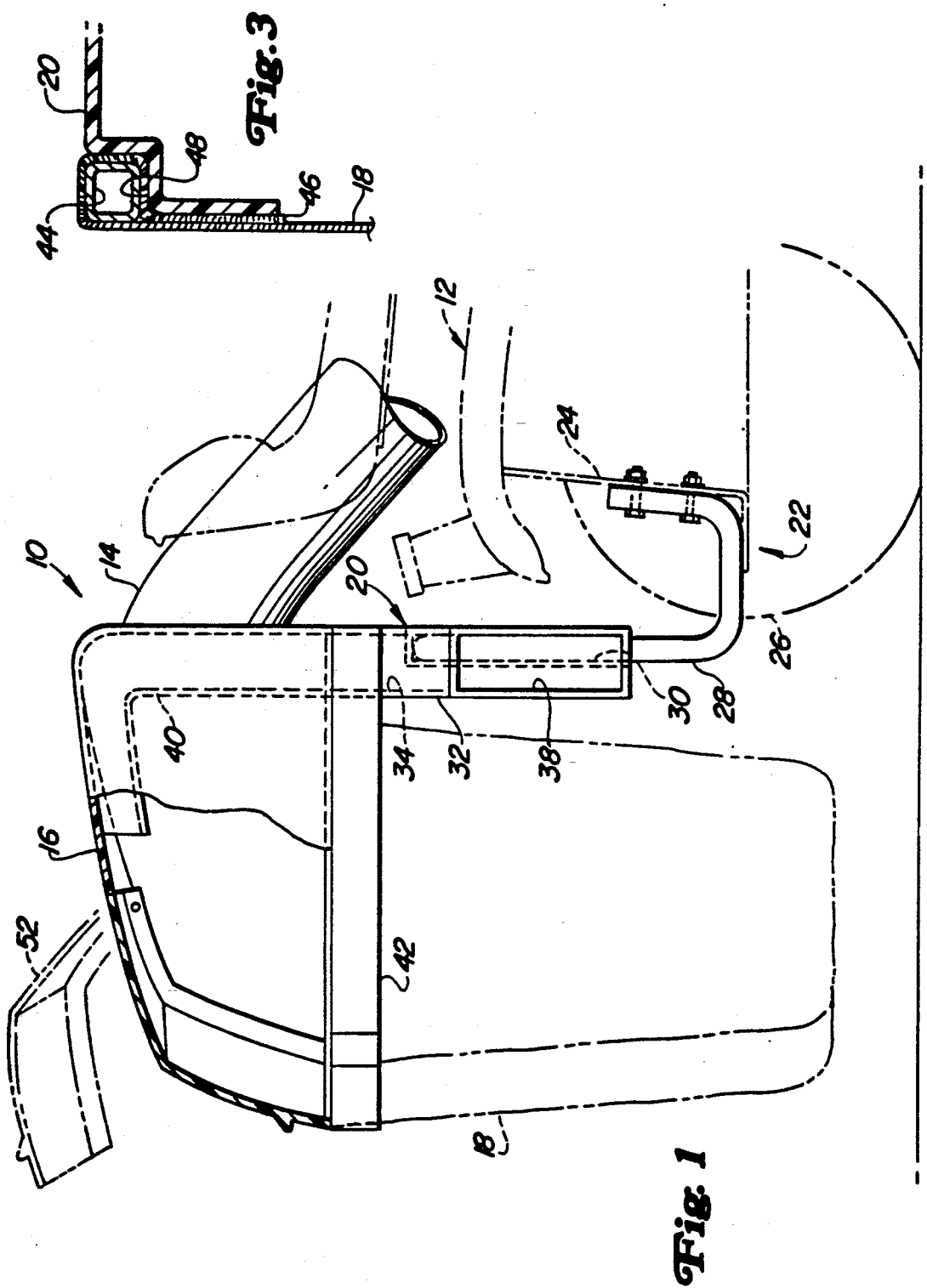
FIG. 1 is a sectional side view of the present invention coupled with the rear portion of a vehicle.

Referring now to FIG. 1, the present invention provides a material collection system 10 within which grass clippings accumulate. The material collection system 10 is carried at the rear of a vehicle 12 such as a lawn tractor. The vehicle 12 has a mower deck (not shown) within which a blade rotates to cut grass. The rotating blade also generates a current of air that acts to propel the grass clippings into a chute 14. The chute 14 is coupled with a cover or hopper top 16 that covers a pair of receptacles or flexible bags 18. The hopper top 16 and flexible bags 18 form a container into which the chute 14 directs clippings and air. The clippings accumulate in the bags 18 by settling downwardly under their own weight. The bags 18 are carried by a support means 20 that is coupled with the rear of the vehicle 12 via an attachment mechanism 22.

Figure 2:
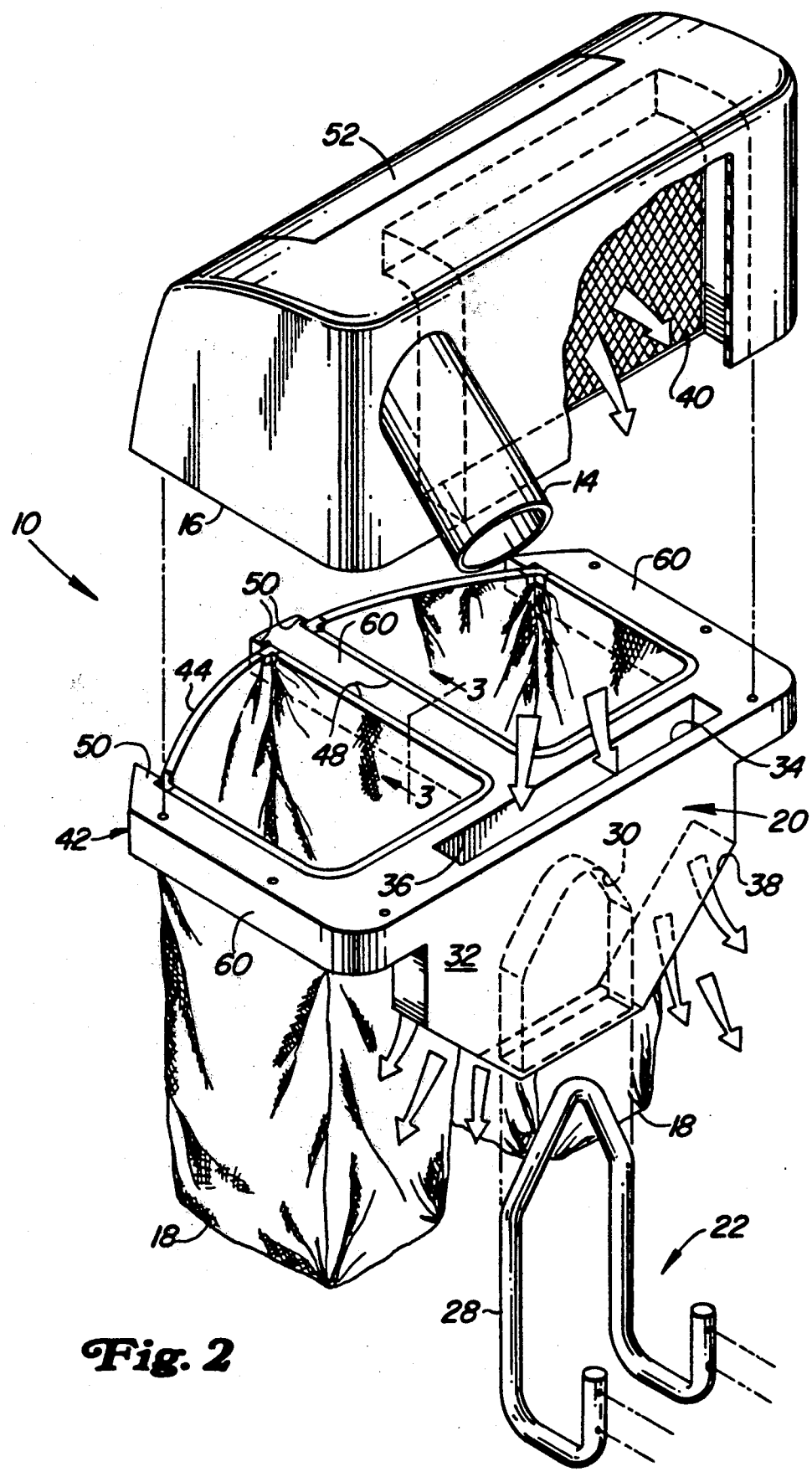
FIG. 2 is a perspective exploded view of the present invention showing the support means removed from the upwardly extending member.

The attachment mechanism 22 includes a plate 24 that is fixed as by bolts to the rear portion of the vehicle 12 between the rear pair of drive wheels 26. To this plate 24 is bolted an upwardly extending member 28 comprised of a tube-like member in an inverted U-shaped position, as seen in FIG. 2. During operation, the tube 28 is slidably and removably received within a mating pocket 30 formed in the support means 20. The support means 20 and collection system 10 supported thereby can be lifted upwardly from the tube 28 for removal of the collector 10 from the vehicle 12. The process of removal and attachment can therefore be performed with a minimum of effort and without requiring the use of tools. The tube 28 can remain fixed to the vehicle 12 even when the support means 20 and collection system 10 is not being used, since the tube 28 does not extend rearwardly an undesirable length or otherwise interfere with the operation of the vehicle 12.

Next, the support means 20 will be described in more detail. The support means 20 includes a generally vertically extending portion 32 that defines a chamber or box-like structure 34. At the top of this generally vertical portion 32 is formed an inlet opening 36 which communicates with the area beneath and within the hopper top 16. Air from within the hopper top 16 is vented downwardly through the inlet 36 and into the chamber 34. As the air travels downwardly within the chamber 34, it is allowed to pass behind and on either side of the pocket 30 and tube member 28. The chamber 34 channels the air downwardly through outlets 38 positioned on each side of the pocket 30. The air is thereby discharged near the ground and between the rear portion of the vehicle 12 and the bags 18. The support means, chamber 34 forms a box-like structure that also serves to generally rigidify the support means 20. The chamber 34 thereby strengthens the support means 20 such that it is more capable of withstanding the large loads associated with operating the vehicle 12 over rough terrain with bags full of grass clippings. Since the chamber 34 acts as both a vent and a strengthening support structure, the amount of material used and the cost required to manufacture the collection system 10 is generally less than if separate structures were provided for performing the venting and strengthening functions.

A screen 40 is coupled with the hopper top 16 for allowing air to pass through the chamber inlet opening 36 while preventing or blocking grass clippings from entering the chamber 34. Grass clippings are thereby kept within the hopper top 16 where gravity will eventually cause the clippings to settle downwardly into the bags 18. Since a screen type of mechanism is used, imperforate plastic bags may be used as liners within the bags 18 for directly receiving the clippings.

FIG. 2 also illustrates an E-shaped portion 42 of the support means 20. The E-shaped portion 42 acts to carry a pair of bags 18 in operating position beneath the hopper top 16 for receiving grass clippings that settle downwardly. The bags 18 are coupled with a frame structure 44 that maintains the bags 18 in open, grass receiving configuration. As seen in FIG. 3, the bags 18 may be coupled to the frames 44 during assembly by folding the end portion 46 of the bag 18 over the frame structure 44, and then stitching or otherwise fixing the folded end portion 46 to the main portion of the bag 18. The bag 18 therefore defines a loop or hem within which the frame structure 44 is positioned. The frame structure 44 thereby maintains the bag 18 in an open, clippings receiving position. Other mechanisms could also be provided for coupling the bag 18 to the frame structure 44.

As seen in FIGS. 2 and 3, the frames 44 are seated during operation in grooves 48 that extend to form a general U-shape in the support means 20. Upstanding abutments 50, shown in FIG. 2, are formed at the ends of the grooves 48 for preventing the frames 44 from shifting during vehicle travel. To remove a frame 44 and bag 18 from the support means 20 when the bag 18 has become full of grass clippings, the hopper door 52 is pivoted to an open position and the frame 44 is lifted slightly to clear the abutment 50. The frame 44 and bag 18 are then slid rearwardly through the opening created by the open hopper door 52 and either lifted from the E-shaped portion 42 or dropped to the ground for emptying.

Figure 4:
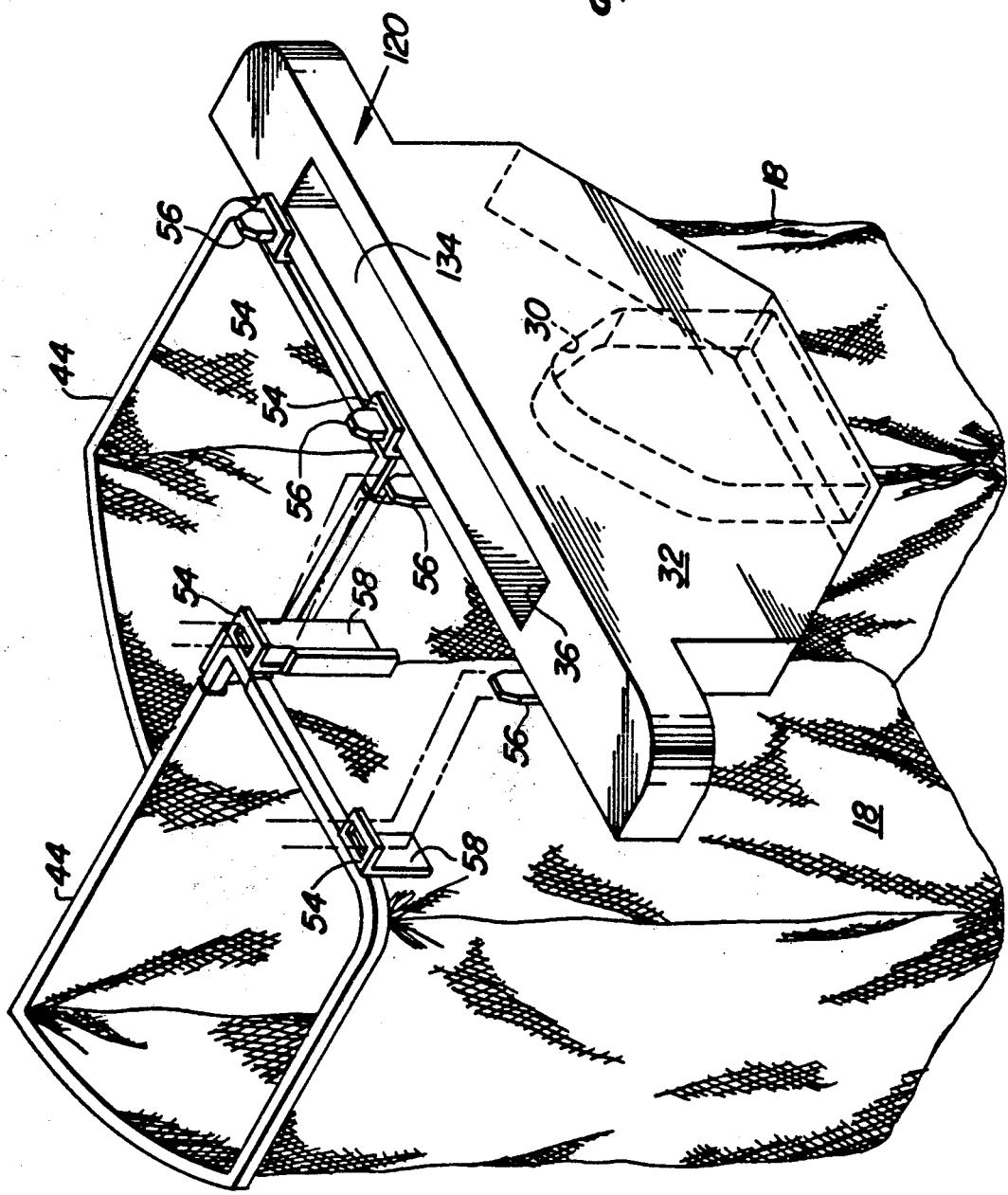
FIG. 4 is a perspective partial view of an alternative embodiment of the present invention showing one of the bags removed from the support means.

A second type of mechanism may also be employed for coupling the frame structure 44 with the support means 20 in clippings receiving position during operation. As seen in FIG. 4, the bag opening is coupled to a frame structure 44. A slotted bracket 54 is fixed to the frame structure 44 for receiving an upstanding tab or peg 56 fixed as by bolts to the support means 120. The weight of the frame structure 44 and contents of the bag 18 bias the frame structure 44 and slotted bracket 54 downwardly and forwardly about the peg 56. A generally vertical portion 58 of the bracket 54 thereby abuts the peg 56, and maintains the frame structure 44 in general horizontal operating position. A plurality of slotted brackets 54 and associated pegs 56 may be used to distribute the loads more evenly across the lateral span of the support member 120. The use of slotted brackets 54 and associated pegs 56 positioned across the width of the support means 120 shown in FIG. 4 generally eliminates the need for legs 60 that define the E-shape of the support means 20 shown in FIG. 2. The material and manufacturing costs of the support means 120 shown in FIG. 4 is therefore less than that of the support means 20 shown in FIG. 2.

The support means 20, hopper top 16 and hopper door 52 according to the preferred embodiment of the present invention are molded from a plastic material. The inlet 36 can be formed by cutting an opening in the support means 20. The hopper top 16 is bolted or otherwise conventionally fixed to the support means 20.

I claim:

1. A material collection mechanism adapted for being coupled with a vehicle having a device for generating a stream of air and air-borne materials, said collection mechanism being adapted for receiving said stream of air and air-borne materials and for venting said air, said mechanism comprising:

attachment means for coupling the material collection system with the vehicle;

container means for receiving air and air-borne material, and within which the materials may accumulate; and support means coupled with and extending between the attachment means and the container means for supporting the container means, a portion of said support means defining a chamber, said portion of the support means serving to rigidify the support means, said support means defining a chamber inlet through which air from the container means passes into the chamber, said support means being adapted to vent air from the container means downwardly through said chamber to discharge said air adjacent the ground.

2. The invention of claim 1, wherein the support means is formed of a plastic material.

3. The invention of claim 1, wherein said chamber includes an outlet, and further including a screen positioned within the container and adjacent the chamber inlet for allowing air from the container to enter the chamber and for blocking material from entering the chamber.

4. The invention of claim 3, wherein the attachment mechanism further comprises:
an upwardly extending member coupled with the vehicle,
a pocket formed in the support means, said pocket removably receiving said upwardly extending member for coupling the support means with the vehicle.

5. The invention of claim 4, wherein said chamber is configured to allow air passing therethrough to flow downwardly toward the ground and on either side of the pocket and upwardly extending member.

6. The invention of claim 4, wherein
the attachment mechanism is coupled to the rear portion of a mowing vehicle and between the mowing vehicle's rear wheels,
the container includes a receptacle within which materials can accumulate,
a chute is coupled with the container for directing a stream of air and air-borne mowed materials into said container,
the container is carried rearwardly of the vehicle, and
the chamber directs air downwardly between the container and the vehicle, and the chamber outlet discharges said air near the ground between the container and the rear of the vehicle.

7. The invention of claim 6, wherein the container means includes a flexible bag within which material may accumulate.

8. The invention of claim 6, and further comprising a means coupled between the receptacle and the support means for maintaining the receptacle in a material receiving position.

9. The invention of claim 8, wherein the means for maintaining the receptacle in a material receiving position further comprises:
a frame coupled with an opening in the receptacle,
a groove formed by the support means and extending in a general U-shape for receiving and supporting the frame, and
upstanding abutments formed at the ends of the grooves for blocking the frame from shifting out of the groove during operation.

10. The invention of claim 8, wherein the means for maintaining the receptacle in a material receiving position further comprises:
a frame coupled with an opening in the receptacle,
a slotted bracket coupled with the frame, and
an upstanding peg means carried by the support means and on which the slotted bracket is received for coupling the frame and receptacle with the support means.

11. The invention of claim 10, and further comprising:
a generally vertical portion formed by the slotted bracket for abutment with the upstanding peg for maintaining the frame structure and receptacle opening in general horizontal position.

12. A material collection mechanism adapted for being coupled with a vehicle having a device for generating a stream of air and air-borne materials, said collection mechanism being adapted for receiving said stream of air and air-borne materials and for venting said air, said mechanism comprising:
attachment means for coupling the material collection system with the vehicle;
container means for receiving air and air-borne materials, and within which the materials may accumulate;
support means coupled with the attachment means and extending upwardly therefrom for supporting the container means, a portion of said support means defining a generally vertically extending chamber, said support means defining a chamber inlet through which air from the container means passes into the chamber, said portion of the support means which defines the chamber serves to rigidify the support means and also channel air received from the container means downwardly through the chamber for discharge adjacent to the ground.

13. The invention of claim 12, wherein the support means is formed of a plastic material.

14. The invention of claim 12, wherein said chamber includes an inlet and an outlet, and further including a screen positioned within the container and adjacent the chamber inlet for allowing air from the container to enter the chamber while blocking material from entering the chamber.

15. The invention of claim 14, wherein the attachment mechanism further comprises:
a member fixedly coupled with the vehicle in inverted U-shaped position,
a pocket formed in the support means, said pocket removably receiving said upwardly extending member for coupling the support means with the vehicle, and
said chamber being configured to allow air passing therethrough to flow downwardly on either side of the pocket and tube toward the ground.

16. The invention of claim 15, wherein
the member is coupled to the rear portion of a mowing vehicle and between the mowing vehicle's rear wheels,
a chute is coupled with the container for directing a stream of air and air-borne material into said container,
the container includes a receptacle within which materials are allowed to accumulate,
the container is carried rearwardly of the vehicle, and
the chamber outlet directs air downwardly between the container and the vehicle near the ground.

17. The invention of claim 16, wherein the container means includes a flexible bag within which material may accumulate.

18. The invention of claim 16, and further comprising a means coupled between the receptacle and the support means for maintaining the receptacle in a material receiving position.

19. The invention of claim 18, wherein the means for maintaining the receptacle in a material receiving position further comprises:
 a frame coupled with an opening in the receptacle,
 a groove formed by the support means and extending in a general U-shape for receiving and supporting the frame, and
 upstanding abutments formed at the ends of the grooves for blocking the frame from shifting out of the groove during operation.

20. The invention of claim 18, wherein the means for maintaining the receptacle in a material receiving position further comprises:
 a frame coupled with an opening in the receptacle,
 a slotted bracket coupled with the frame, and
 an upstanding peg means carried by the support means and on which the slotted bracket is received for coupling the frame and receptacle with the support means.

21. The invention of claim 20, and further comprising:
 a generally vertical portion formed by the slotted bracket for abutment with the upstanding peg for maintaining the frame structure and receptacle opening in general horizontal position.

22. A vegetation clippings collection mechanism adapted for being coupled to a powered mowing vehicle having a device for generating a stream of air and air-borne mowed clippings, said collection mechanism being adapted for receiving said stream of air and air-borne mowed clippings from a chute, said mechanism comprising:
 attachment means for coupling the clipping collection mechanism with the vehicle;
 container means in communication with the chute for receiving air and air-borne clippings, and within which clippings may accumulate;
 support means coupled with the attachment means and extending upwardly for supporting the container means, a portion of said support means defining a generally vertically extending chamber for rigidifying the support means, said support means defining a chamber inlet through which air from the container means passes into the chamber, said portion of the support means which defines the chamber being adapted for channeling air received from the container means downwardly through the chamber for discharge near the ground.

23. The invention of claim 22, wherein said chamber includes an inlet and an outlet, and further including a screen positioned within the container and adjacent the chamber inlet for allowing air from the container to enter into the chamber while blocking clippings from entering the chamber.

24. The invention of claim 23, wherein the support means is formed of a plastic material.

25. The invention of claim 23, wherein the attachment mechanism further comprises:
 a member fixedly coupled with the vehicle in inverted U-shaped position,
 a pocket formed in the support means, said pocket removably receiving said upwardly extending member for coupling the support means with the vehicle, and
 said chamber being configured to allow air passing therethrough to flow downwardly on either side of the pocket and member toward the ground.

26. The invention of claim 25, wherein the member comprises a tube fixed to the vehicle.

27. The invention of claim 26, wherein
 the member is coupled to the rear portion of a mowing vehicle and between the mowing vehicle's rear wheels,
 the container is carried rearwardly of the vehicle, and
 the chamber outlet directs air downwardly between the container and the vehicle near the ground.

28. The invention of claim 27, wherein the container means includes a flexible bag within which material may accumulate.

29. The invention of claim 28, and further comprising a means coupled between the flexible bag and the support means for maintaining the flexible bag in a material receiving position.

30. The invention of claim 29, wherein the means for maintaining the flexible bag in a material receiving position further comprises:
 a frame coupled with an opening in the flexible bag,
 a groove formed by the support means and extending in a general U-shape for receiving and supporting the frame, and
 upstanding abutments formed at the ends of the grooves for blocking the frame from shifting out of the groove during operation.

31. The invention of claim 29, wherein the means for maintaining the flexible bag in a material receiving position further comprises:
 a frame coupled with an opening in the flexible bag,
 a slotted bracket coupled with the frame, and
 an upstanding peg means carried by the support means and on which the slotted bracket is received for coupling the frame and flexible bag with the support means.

32. The invention of claim 31, and further comprising:
 a generally vertical portion formed by the slotted bracket for abutment with the upstanding peg for maintaining the frame structure and bag opening in general horizontal position.

33. A material collection mechanism adapted for being coupled with a vehicle having a device for generating a stream of air and air-borne materials, said collection mechanism being adapted for receiving said stream of air and air-borne materials and for venting said air, said mechanism comprising:
 attachment means for coupling the material collection system with the vehicle;
 container means for receiving air and air-borne material, and within which the materials may accumulate; and
 support means coupled with and extending between the attachment means and the container means for supporting the container means, said support means defining a chamber inlet through which air from the container means passes into the support means, said support means being adapted to vent air from the container means downwardly and discharge said air adjacent the ground, wherein a portion of the support means defines a chamber, said portion of the support means serving to rigidify the support means and receive air from the container for directing said air downwardly through the chamber toward the ground.

34. The invention of claim 33, wherein the support means is formed of a plastic material.

35. The invention of claim 33, wherein said chamber includes an inlet and an outlet, and further including a screen positioned within the container and adjacent the chamber inlet for allowing air from the container to enter the chamber and for blocking material from entering the chamber.

36. The invention of claim 35, wherein the attachment mechanism further comprises:
an upwardly extending member coupled with the vehicle,
a pocket formed in the support means, said pocket removably receiving said upwardly extending member for coupling the support means with the vehicle.

37. The invention of claim 36, wherein said chamber is configured to allow air passing therethrough to flow downwardly toward the ground and on either side of the pocket and upwardly extending member.

38. The invention of claim 36, wherein
the attachment mechanism is coupled to the rear portion of a mowing vehicle and between the mowing vehicle's rear wheels,
the container includes a receptacle within which materials can accumulate,
a chute is coupled with the container for directing a stream of air and air-borne mowed materials into said container,
the container is carried rearwardly of the vehicle, and
the chamber directs air downwardly between the container and the vehicle, and the chamber outlet discharges said air near the ground between the container and the rear of the vehicle.

39. The invention of claim 38, wherein the container means includes a flexible bag within which material may accumulate.

40. The invention of claim 38, and further comprising a means coupled between the receptacle and the support means for maintaining the receptacle in a material receiving position.

41. The invention of claim 40, wherein the means for maintaining the receptacle in a material receiving position further comprising:
a frame coupled with an opening in the receptacle,
a groove formed by the support means and extending in a general U-shape for receiving and supporting the frame, and
upstanding abutments formed at the ends of the grooves for blocking the frame from shifting out of the groove during operation.

42. The invention of claim 40, wherein the means for maintaining the receptacle in a material receiving position further comprises:
a frame coupled with an opening in the receptacle,
a slotted bracket coupled with the frame, and
an upstanding peg means carried by the support means and on which the slotted bracket is received for coupling the frame and receptacle with the support means.

43. The invention of claim 42, and further comprising:
a generally vertical portion formed by the slotted bracket for abutment with the upstanding peg for maintaining the frame structure and receptacle opening in general horizontal position.

* * * * *